United States Patent [19]
Whitaker

[11] 3,801,338
[45] Apr. 2, 1974

[54] CEMENT ADDITIVES
[75] Inventor: Granville Whitaker, Hemel Hempstead, England
[73] Assignee: Fosroc A.G., Zug, Switzerland
[22] Filed: July 10, 1972
[21] Appl. No.: 270,358

[52] U.S. Cl............................... 106/90, 106/315
[51] Int. Cl............................................. C04b 7/02
[58] Field of Search..................... 106/90, 315, 314

[56] References Cited
UNITED STATES PATENTS
3,210,207 10/1965 Dodson et al........................ 106/90
3,668,150 6/1972 Horvitz................................. 106/90
3,329,517 7/1967 Dodson et al........................ 106/90
2,860,060 11/1958 Benedict et al...................... 106/90

Primary Examiner—Delbert E. Gantz
Assistant Examiner—James W. Hellwege
Attorney, Agent, or Firm—Caesar, Rivise, Bernstein & Cohen

[57] ABSTRACT

An additive for hydraulic cement comprises a major amount of sodium nitrite in admixture with a minor amount of calcium formate, optionally with triethanolamine or sodium benzoate.

13 Claims, No Drawings

CEMENT ADDITIVES

BACKGROUND OF THE INVENTION

This invention relates to additives for hydraulic cements and, more particularly, additives for concretes which are to contain metal reinforcement. Such additives may be added to a hydraulic cement at a cement manufacturing plant or on a construction site.

The term "hydraulic cement" means a cementitious composition capable of being set and hardened by the action of water; examples are Portland cement, sulphate-resisting cements, blast-furnace cements, and pozzolanic cements.

When, for example, a Portland cement, (mainly calcium silicate $3CaO \cdot SiO_2$ and a minor amount of tricalcium aluminate $3CaO \cdot Al_2O_3$), is mixed with water, setting takes place in only a few hours. However the hardening of the cement takes much longer; in some cases final hardness is only achieved after weeks. The setting is due to the initial reaction of water with the tricalcium aluminate and the hardening is mainly due to the reaction of water with the tricalcium silicate. Ultimately, a gelatinous hydrated product, (probably gelatinous calcium silicate) forms and probably binds the particles together.

The rate of setting is dependant on the temperature, the setting reaction proceeding very slowly at lower temperatures. It is desirable to accelerate setting. As on-site heating is beset with difficulties, it is general practice to add to the water/hydraulic cement mix, a setting accelerator, which serves to decrease the setting time both at high and at low temperatures. Such accelerators include chlorides, carbonates, hydroxides or fluorsilicates. Calcium chloride is widely used but the chloride ions react with atmospheric moisture and oxygen to form an acidic mixture which will attack a metal reinforcement. Unless the reinforcement is completely sealed against the atmosphere it can, in time, be seriously corroded. Hence calcium chloride is not preferred for use with metal (especially steel) reinforced concrete.

SUMMARY OF THE INVENTION

It is an object of the invention to provide an additive for a hydraulic cement usable with metal reinforcement.

It is an object of the invention to provide an additive for a hydraulic cement which can be used at low temperatures.

It is another object of the invention to provide an additive for hydraulic cement which is free of chloride.

It is yet another object of the invention to provide an additive for hydraulic cement which gives improved concrete compressive strength.

These and other objects of the invention are obtained using an additive which comprises a major amount of sodium nitrite in admixture with a minor amount of calcium formate. Optionally the additive may also contain a third constituent, for example triethanolamine or sodium benzoate, e.g. in a proportion up to 40% by weight.

A preferred dry additive comprises 19 to 48% calcium formate, 81 to 52% sodium nitrite, and 0.1% to 10% of triethanolamine or sodium benzoate. Water may be added in a weight ratio of water to additive of up to 0.8:1, preferably 0.4 to 0.6 to form a liquid additive.

The additive may be admixed with the cement just before use on site or dry additive may be admixed with the cement in manufacture, and water added on site. Preferably the additive is dissolved in the gauging water (water used for admixture with the cement) which is then added to cement.

The additive may be added to the cementitious composition in amounts up to 20% by weight, preferably 1–6% by weight.

The following examples will serve to illustrate the invention. In these examples, use is made of two specific additives (parts are by weight)

Additive A calcium formate 48%
sodium nitrite 52%
(Application rate 1.8 lb/cwt dry cement)

Additive B calcium formate 19.5%
sodium nitrite 77.9%
triethanolanium 2.6%
(Application rate 2 lbs/cwt dry cement.)

The following test procedures were used in the Examples. Compressive strength was measured on a concrete containing by weight, one part test cement (Portland or sulphate-resisting) 2.4 parts sand and 3.6 parts ¾ inch to 3/16 inch Thames gravel, these being mixed according to British Standard BS 1881. The 4 inch cubes for compressive strength determinations were cured under BS 12 conditions (i.e. 20° C) or immediately placed at +6° C and then cycled every 24 hours between +6° C and −6° C.

Water Reduction was determined by the following test. If the quantity of water required to give a control concrete a degree of workability is 100%, the water content required by cement with admixture for the same workability expressed as a percentage of the control concrete water requirement is termed "water reduction" (for example if without admixture 60 lbs of water is required, but with admixture only 54, water reduction is [(60−54)/60] × 100 = 10%).

The Proctor Needle and Vicat tests to determine setting times were performed as described in ASTMC. 40.3 with 1:2:4 mortars and British Standard BS 12 with neat cement, respectively. The slump test was measured as described in British Standard BS 1881 and BS 12.

EXAMPLE I

Samples of ordinary Portland cement and sulphate-resisting cement were made up into a concrete as indicated, with and without the additives as indicated in Table I. The products were cured at 20° C. and measured and the results are shown in Tables I and II below.

The results of Tables I and II show that both additives give a much higher compressive strength in all stages of setting and hardening than the control.

TABLE I

| Sample | Water/Cement Ratio | Slump (ins.) | Water Reduction | Density (lb/cu.ft.) | Compressive Strength (p.s.i.) 18hr 20hr 24hr 3day 7day |
|---|---|---|---|---|---|
| Control | 0.625 | 1 7/8 | — | 146.2 | Ordinary Portland Cement |
|  |  |  |  |  | 730  970 1540 2660 3750 |
| Additive B (1.2 lbs/cwt) Cement | 0.625 | 1 7/8 | — | 146.2 | 1470 1760 1680 3470 4060 |
| Additive A (1½ lb/cwt) | 0.625 | 1 3/4 | — | 146.9 | 1270 1260 1820 3440 4800 |
| Control | 0.625 | 2 1/8 | — | 148.6 | 1050 1190 1680 2730 3850 |
| Additive B (2.4 lb/cwt) | 0.605 | 1 7/8 | 3.2 | 148.1 | 1820 2100 2500 3640 4740 |
| Additive A (3 lb/cwt) | 0.600 | 2 1/8 | 4.0 | 147.7 | 1470 1540 1970 2450 4070 |
| Control | 0.610 | 2 | — | 147.0 | Sulphate resisting Cement |
|  |  |  |  |  | 670  980 1150 3080 3550 |
| Additive B (1.2 lb/cwt cement) | 0.605 | 2 3/4 | 0.8 | 145.0 | 900 1060 1400 3470 4190 |
| Additive A (1½lb/cwt) | 0.559 | 2 1/4 | 1.8 | 146.0 | 830 870 1370 3080 4170 |
| Control | 0.591 | 1 7/8 | — | 147.7 | 700 1120 1050 2370 3640 |
| Additive B (2.4 lb/cwt cement) | 0.575 | 1 7/8 | 2.7 | 146.4 | 1470 1750 1890 3500 5020 |
| Additive A (3 lb/cwt) | 0.545 | 2 1/8 | 7.8 | 147/1 | 1330 1680 1960 3500 4970 |

TABLE II

| Sample | Water/cement ratio | Slump (ins.) | Water reduction | Density (lb./cu. ft.) | Compressive strength (p.s.i.) | | | | | |
|---|---|---|---|---|---|---|---|---|---|---|
| | | | | | 18 hrs. | 20 hrs. | 24 hrs. | 3 days | 7 days | |
| Control | 0.585 | 2½ | | 147.1 | 60 | 60 | 60 | 170 | 630 | Sulphate resisting cement. |
| Additive B (1.2 lb./cwt. cement) | 0.578 | 2¼ | 1.2 | 147.3 | 170 | 170 | 210 | 640 | 1,530 | |
| Additive A (1½ lb./cwt.) | 0.568 | 2½ | 2.9 | 147.2 | 140 | 210 | 220 | 840 | 1,650 | |
| Control | 0.591 | 1¾ | | 145.6 | | | 280 | 980 | 2,430 | |
| Additive B (2.4 lb./cwt. cement) | 0.575 | 1¼ | 2.7 | 146.1 | | | 770 | 1,340 | 3,220 | |
| Additive A (3 lb./cwt.) | 0.545 | 1½ | 7.8 | 147.6 | | | 910 | 1,680 | 3,640 | |
| Control | 0.625 | 1¼ | | 148.0 | 170 | 140 | 210 | 310 | 770 | Ordinary portland cement. |
| Additive B (1.2 lb./cwt. cement) | 0.603 | 2 | 3.0 | 146.8 | 500 | 560 | 620 | 1,310 | 1,820 | |
| Additive A (1½ lb./cwt.) | 0.625 | 1 7/8 | | 145.5 | 340 | 310 | 240 | 950 | 1,410 | |
| Control | 0.625 | 2¼ | | 147.4 | | | 350 | 840 | 2,310 | |
| Additive B (1.2 lb./cwt. cement) | 0.603 | 1 7/8 | 3.2 | 148.1 | | | 1,140 | 1,960 | 3,360 | |
| Additive A (3 lb./cwt.) | 0.600 | 2¼ | 4.0 | 147.8 | | | 900 | 1,680 | 3,190 | |

EXAMPLE II

A series of tests were set up to test the efficiency of additive B at various addition rates and temperatures.

The samples were tested by measurement of the Proctor Needle Setting times on two samples of 1:2.4 mortars (sulphate resisting and ordinary Portland cement). The results are given in Tables III and IV.

EXAMPLE III

A further set of comparative tests was set up under various conditions using the following:

Additive C comprised 75% calcium formate, 25% sodium nitrite

Additive D comprised 48% calcium formate, 52% sodium nitrite

Additive E comprised 25% calcium formate, 75% sodium nitrite

The cement used was ordinary Portland cement.

The results are given below in Table V in the terms of the compressive strength in p.s.i. and in percent of control after the times indicated.

EXAMPLE IV

The compressive setting time of the compositions of Example III was determined on Portland Cement, the samples being cured at 20° C. The Vicat and Proctor Needle determinations in minutes are shown in Table VI.

From the results of the Tables, it is clear that additives of this invention give positive strength increases and acceleration of setting times over the controls and compare favourably with $CaCl_2$ with regard to strength and setting times.

Further tests have shown that the resultant concretes show no negative results with regard to shrinkage and sulphate resistance, and have a positive corrosion inhibition effect.

TABLE III

Using Portland Cement

| Sample | Rate of Addition | Temperature (°C) | Water/Cement Ratio | Setting Times(hrs) | |
|---|---|---|---|---|---|
| | | | | Initial | Final |
| Control | – | 20 | 0.408 | 3.1 | 5.0 |
| Additive B | 1.2 lb | 20 | 0.406 | 2.5 | 3.7 |
| Additive A | 1½ lb | 20 | 0.407 | 2.7 | 4.0 |
| Control | – | 20 | 0.415 | 3.3 | 5.1 |
| Additive B | 2.4 lb | 20 | 0.393 | 2.4 | 3.3 |
| Additive A | 3 lb | 20 | 0.422 | 2.4 | 3.5 |
| Control | – | 6 | 0.455 | 6.5 | 10.6 |
| Additive B | 1.2 lb | 6 | 0.400 | 3.8 | 6.0 |
| Additive A | 1½ lb | 6 | 0.410 | 3.9 | 6.5 |
| Control | – | 6 | 0.400 | 5.0 | 10.0 |
| Additive B | 2.4 lb | 6 | 0.400 | 3.0 | 6.2 |
| Additive A | 3 lb | 6 | 0.400 | 3.0 | 6.3 |

TABLE IV

Using Sulphate resisting Cement

| Sample | Rate of Addition (lb) | Temperature (°C) | Water/Cement Ratio | Setting Times (hrs) Initial | Final |
|---|---|---|---|---|---|
| Control | – | 20 | 0.397 | 4.8 | 6.8 |
| Additive B | 1.2 | 20 | 0.403 | 4.7 | 6.5 |
| Additive A | 1½ | 20 | 0.305 | 4.0 | 5.5 |
| Control | – | 20 | 0.393 | 4.7 | 6.3 |
| Additive B | 2.4 | 20 | 0.393 | 4.2 | 5.7 |
| Control | – | 6 | 0.395 | 11 | – |
| Additive B | 1.2 | 6 | 0.375 | 8 | – |
| Additive A | 1½ | 6 | 0.375 | 8 | – |
| Control | – | 6 | 0.40 | 10.8 | 19 |
| Additive B | 2.4 | 6 | 0.40 | 6.2 | 11.3 |
| Additive A | 3 | 6 | 0.40 | 4.0 | 10.0 |

These results show that the additives decrease the setting time of both Portland Cement and sulphate-resisting cement.

TABLE V

| Sample Ref. | Curing Cond's. | W/C Ratio | Slump (ins) | Comp. Strength (p.s.i.) 1day | 3Day | 7day | 28day |
|---|---|---|---|---|---|---|---|
| Control | −5°C last 24 hrs in Water at 19°C | 0.718 | 2¼ | | 840 | 750 | 700 |
| 2% Mix C | | 0.679 | 2½ | | 830 | 690 | 570 |
| 2% Mix D | | 0.680 | 2¼ | | 1130 | 770 | 870 |
| 2% Mix E | | 0.670 | 2¼ | | | 850 | 1000 |
| 2% CaCl₂ Flake | | 0.660 | 2 | | 1110 | 880 | 740 |
| Control | Cured outdoors | 0.680 | 2 | 180 | | 2040 | 3520 |
| 2% Mix D | Max.Temp 11°C | 0.670 | 2 | 630 | | 3080 | 5270 |
| 2% CaCl₂ Flake | Min. Temp −3°C Mean Temp 4°C | 0.603 | 2 | 720 | | 3160 | 5030 |
| Control | BS.12 (Std. Lab. Cond'ns.) | 0.676 | 2 | 1130 | | 3840 | 5030 |
| 2% Mix D | | 0.660 | 2 | 1730 | | 5040 | 6340 |
| 2% CaCl₂ Flake | | 0.610 | 2 | 1550 | | 4590 | 5950 |
| Control | BS.12 (Std. Lab. Cond'ns.) | 0.673 | 2 | 1260 | | 4240 | 5840 |
| 1% Mix D | | 0.640 | 2 | 1750 | | 4690 | 6250 |
| 1% Mix E | | 0.640 | 2 | 1620 | | 4790 | 6080 |
| 1% CaCl₂ Flake | | 0.646 | 2 | 1780 | | 4990 | 6210 |

TABLE VI

| Sample | Vicat Initial Set | Final Set | Proctor Needle Initial Set | Final Set |
|---|---|---|---|---|
| Control | 115 | 185 | 310 | 430 |
| 2% Mix C | 100 | 135 | – | – |
| 2% Mix D | 75 | 120 | 170 | 290 |
| 2% Mix E | 65 | 115 | – | – |
| 2% CaCl₂ Flake | 55 | 90 | 150 | 250 |
| Control | 140 | 220 | 310 | 430 |
| 1% Mix D | 115 | 165 | 220 | 300 |
| 1% Mix E | – | 14 | 220 | 280 |
| 1% CaCl₂ Flake | 80 | 105 | 160 | 250 |

Without further elaboration, the foregoing will so fully illustrate my invention that others may, by applying current or future knowledge, readily adapt the same for use under various conditions of service.

I claim:

1. An additive for use in hydraulic cements, comprising a major amount of sodium nitrite in admixture with a minor amount of calcium formate, said major amount of sodium nitrite comprising about 52% to 81% by weight of said additive and said minor amount of calcium formate comprising about 19% to 48% by weight of said additive.

2. An additive according to claim 1, which also contains triethanolamine or sodium benzoate.

3. An additive according to claim 2, wherein the triethanolamine or sodium benzoate is present in a proportion of up to 40% by weight of the additive.

4. An additive according to claim 2 wherein the triethanolamine or sodium benzoate comprises about 0.1 to 10% by weight of said additive.

5. An additive according to claim 1 and water.

6. An additive according to claim 5 in which the weight ratio of water to additive is in the range of 4:1 to 1:9.

7. An additive according to claim 6 wherein the weight ratio of water to additive is in the range 2:3 to 3:2.

8. An additive according to claim 1, and a dispersant to present the additive in liquid, paste or powder form.

9. An additive according to claim 1 comprising about 48% calcium formate, and about 52% sodium nitrite.

10. An additive according to claim 2 comprising about 19.5% calcium formate, about 77.9% sodium nitrite, and about 2.6% triethanolamine.

11. A cementitious composition incorporating an additive according to claim 1.

12. A cementitious composition according to claim 11, in which the weight of additive in the composition is up to about 20%.

13. A cementitious composition according to claim 12, in which the weight of additive in the composition is about 1% to about 6%.

* * * * *